No. 762,400. PATENTED JUNE 14, 1904.
C. L. GOEHRING & W. TROCHE.
GLASS GRINDING MACHINE.
APPLICATION FILED NOV. 21, 1903.
NO MODEL. 8 SHEETS—SHEET 7.
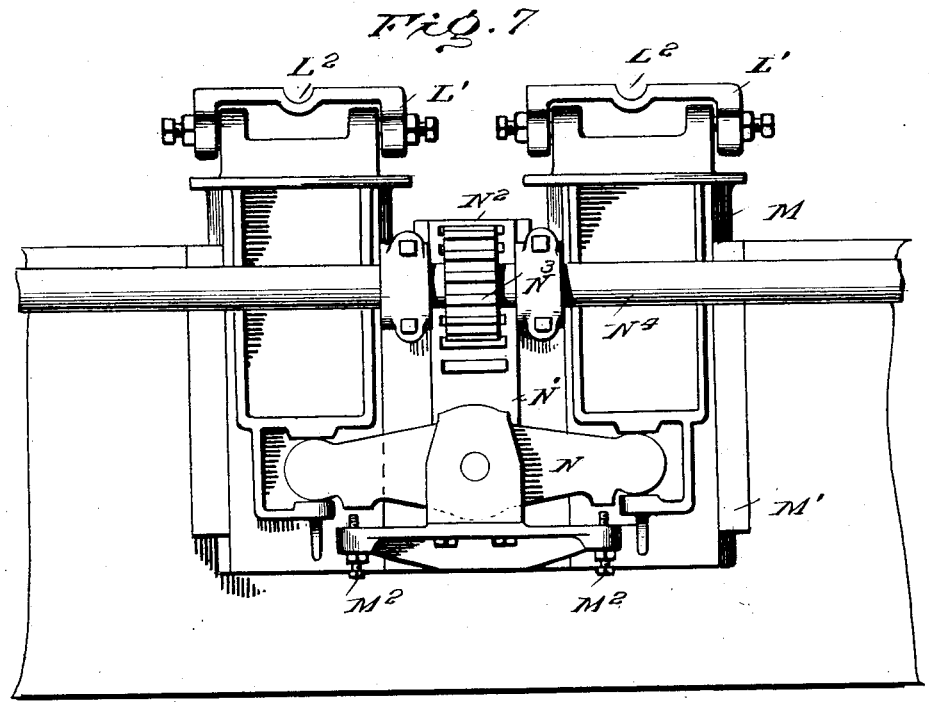
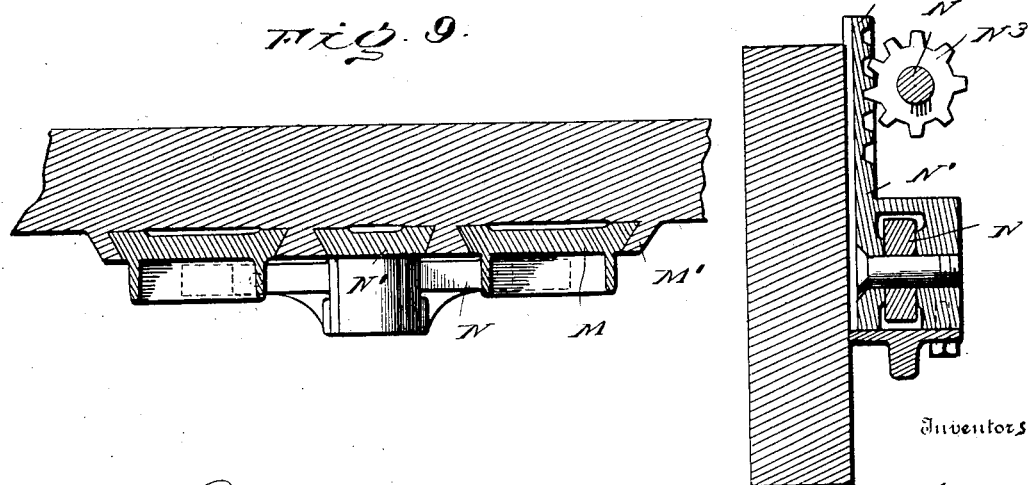

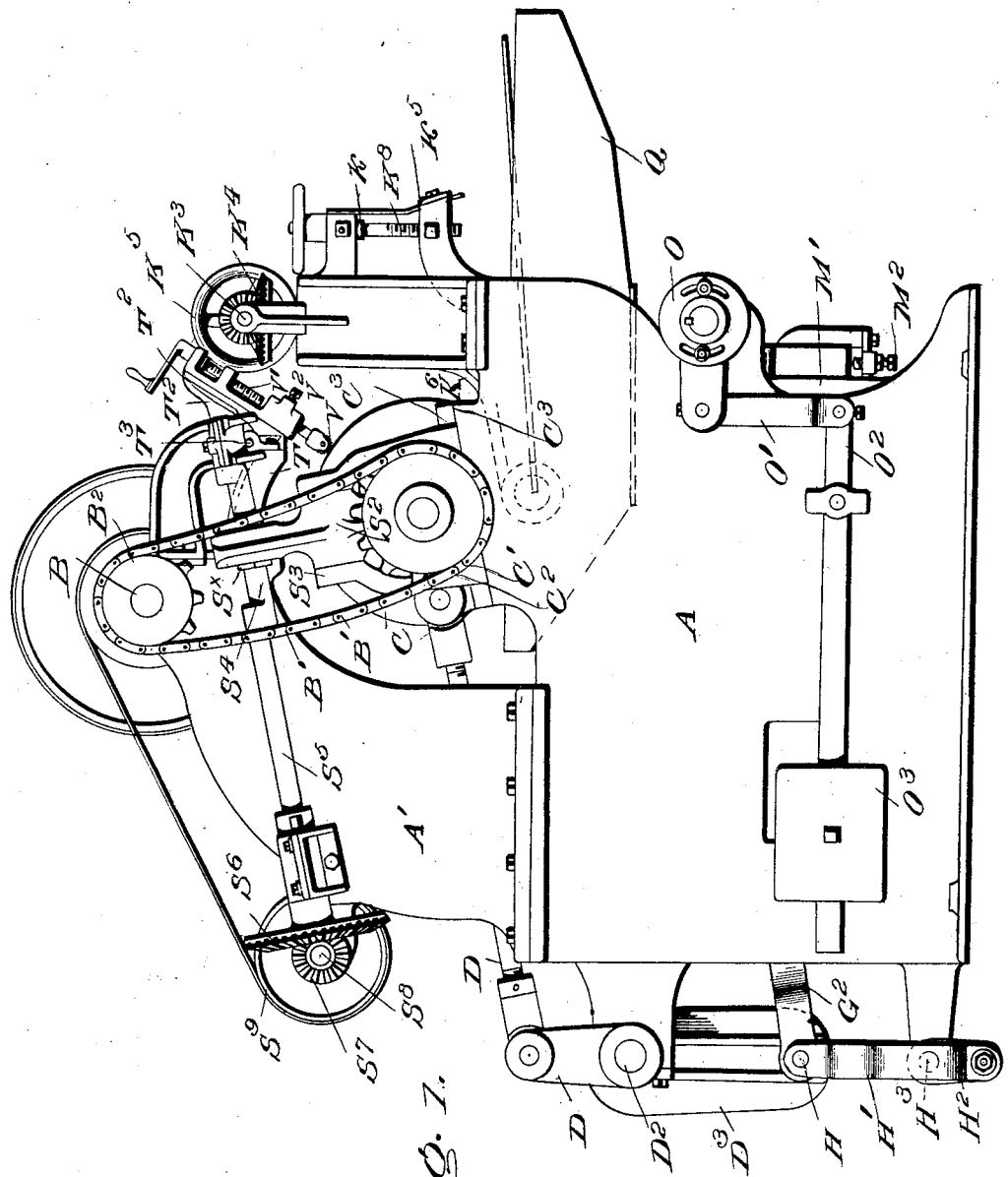

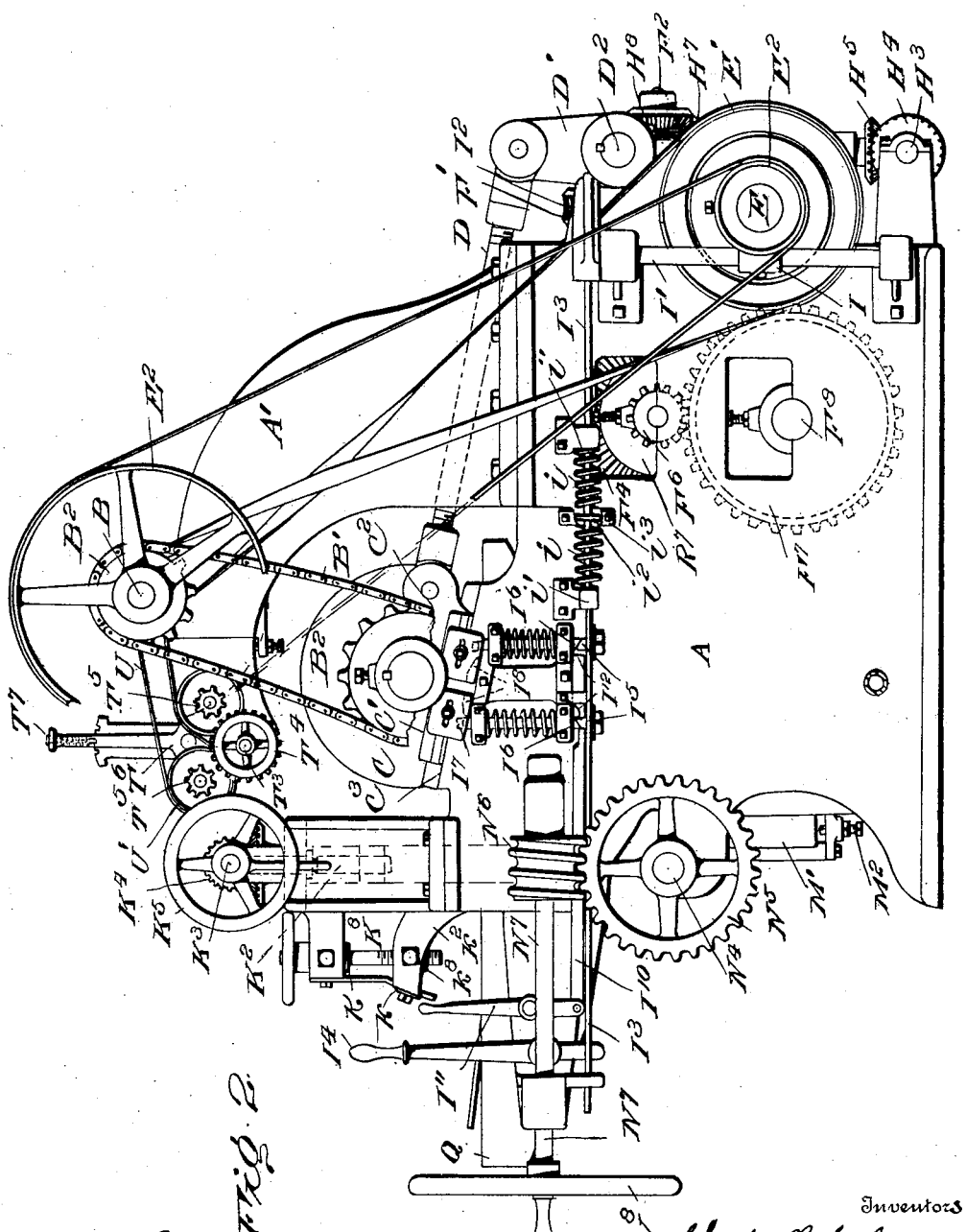

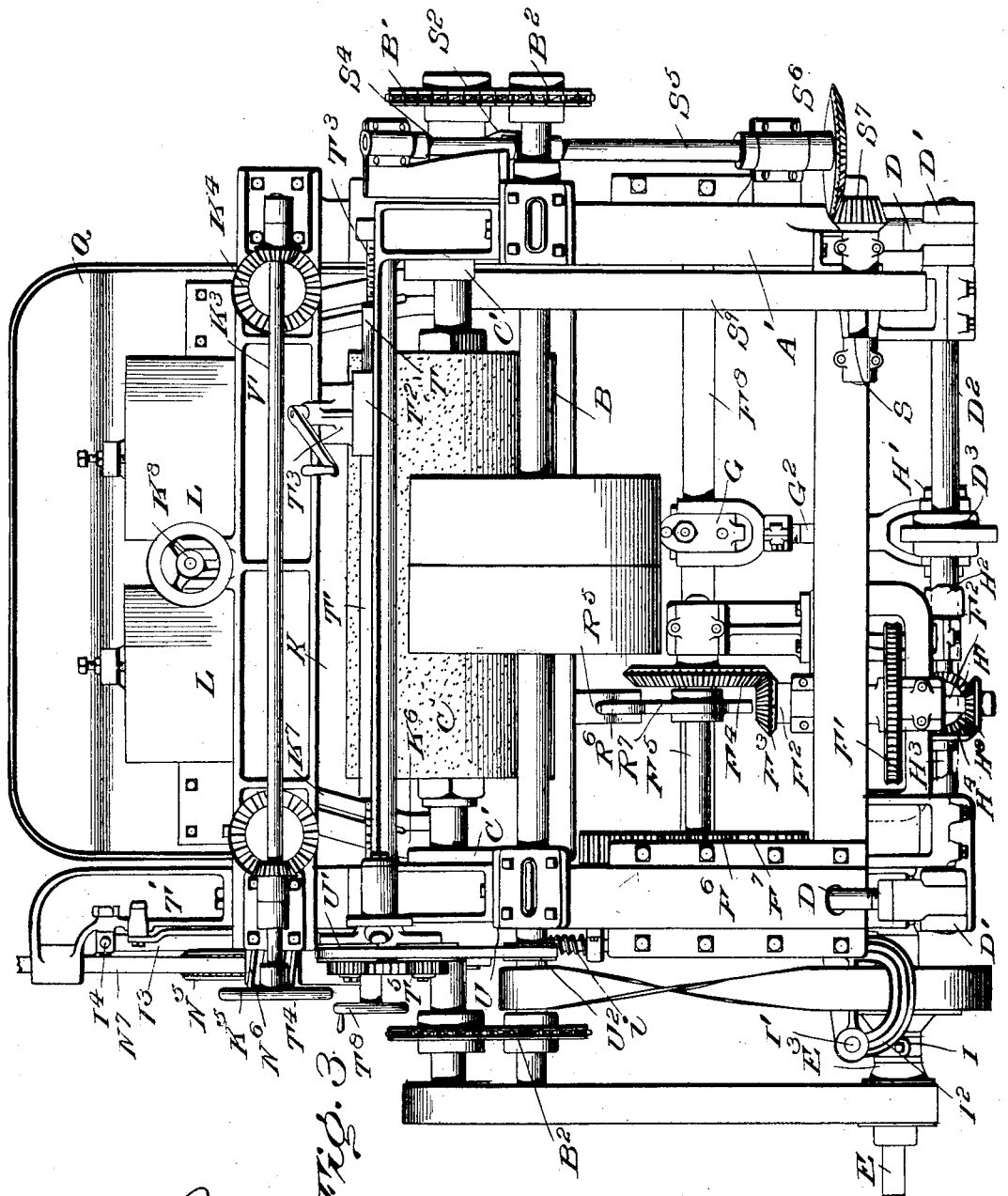

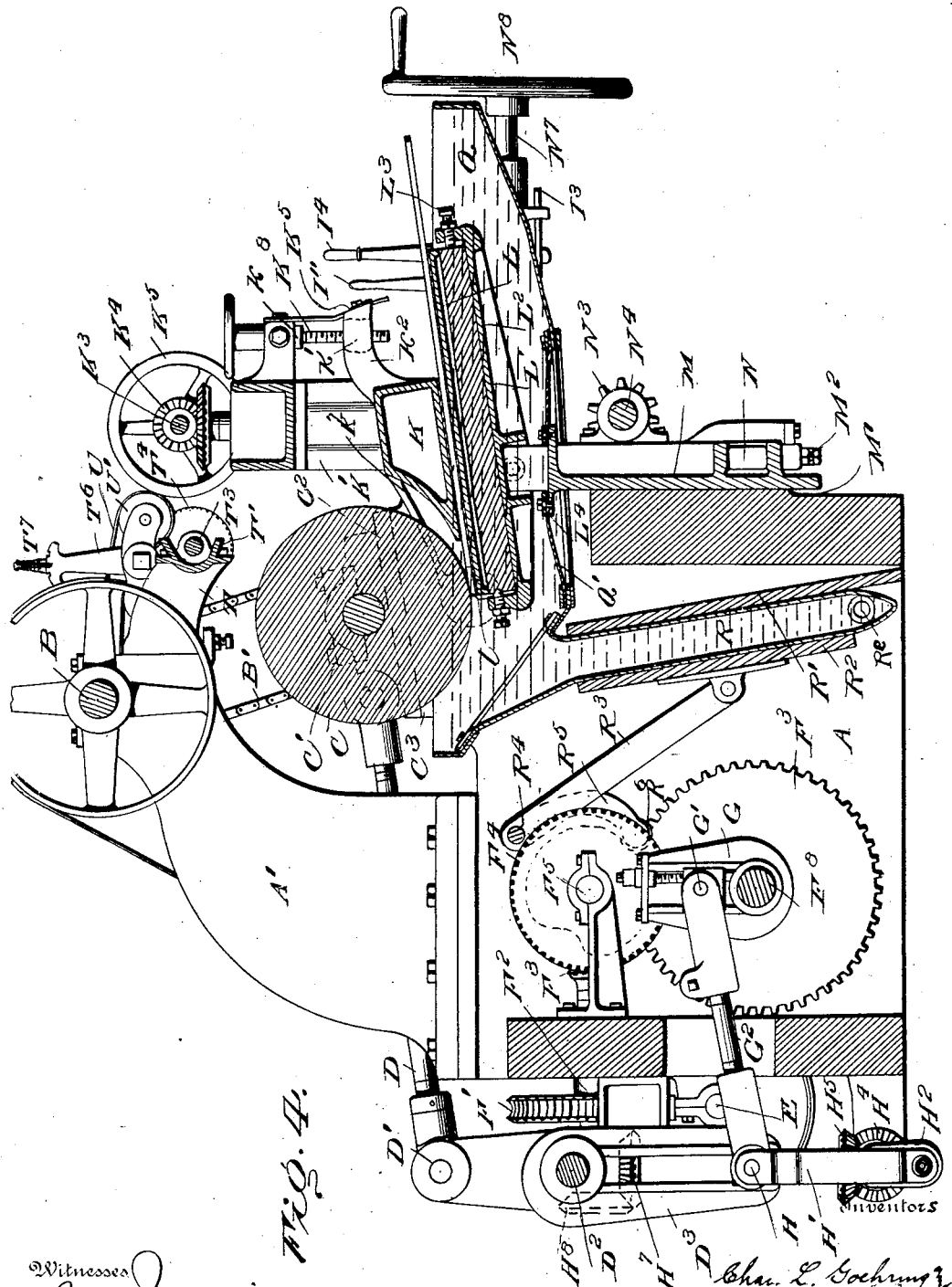

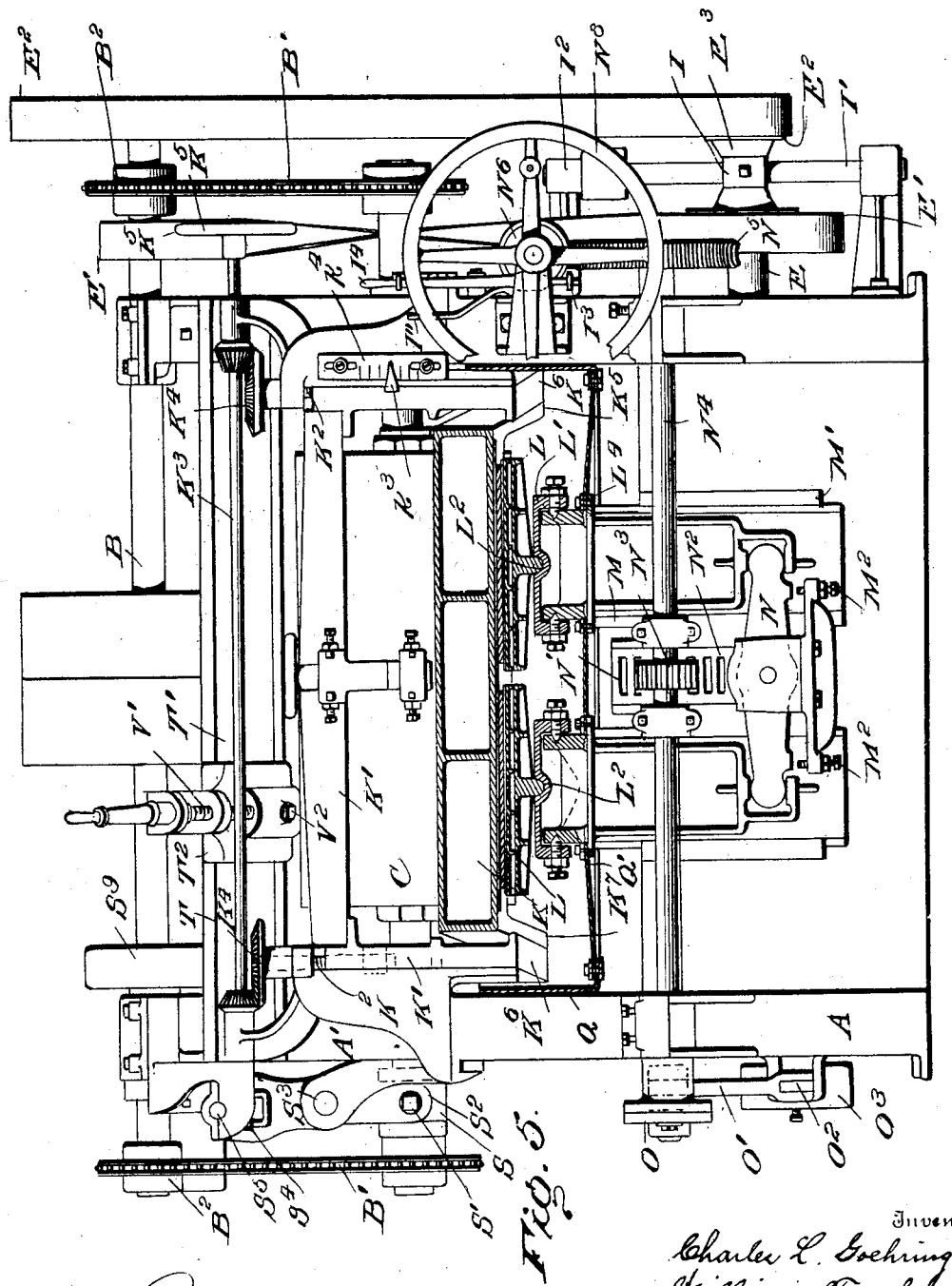

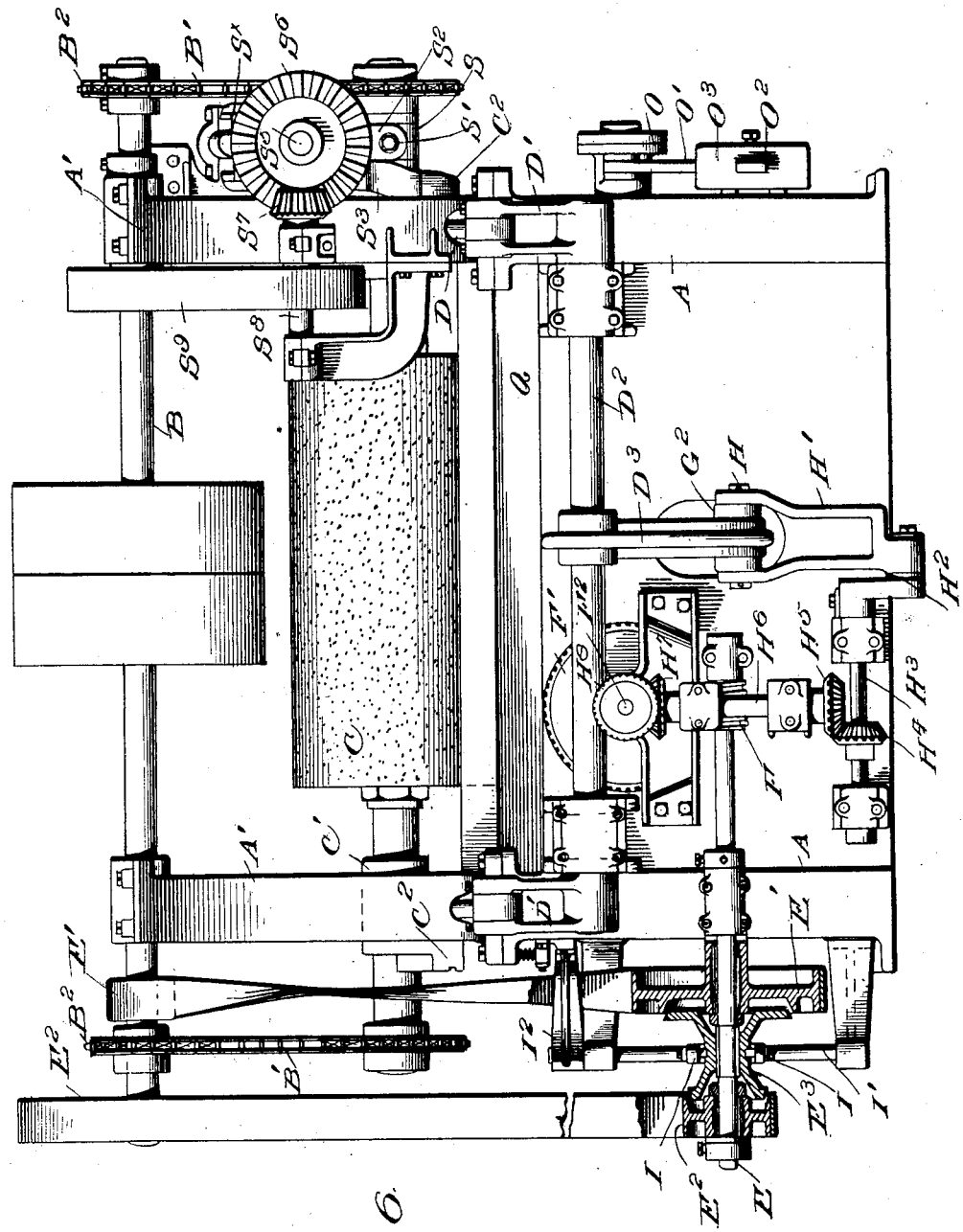

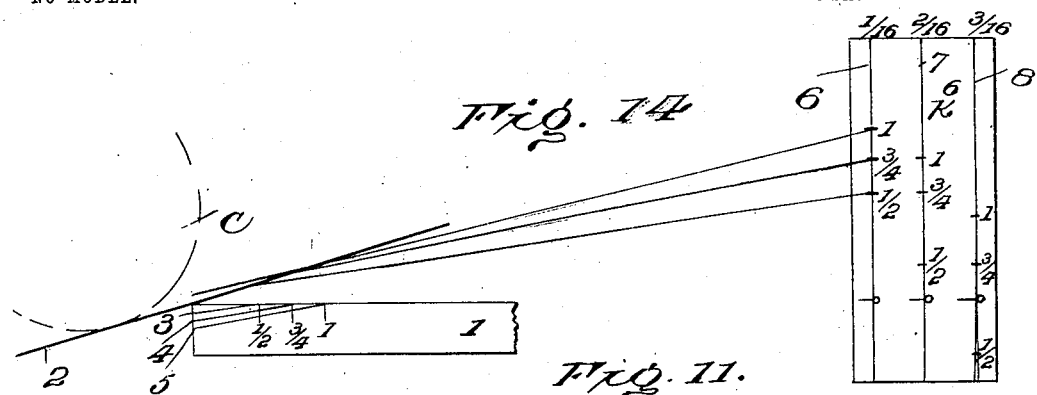

No. 762,400.

Patented June 14, 1904.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-GRINDING MACHINE.

SPECIFICATION forming part of Letters Patent No. 762,400, dated June 14, 1904.

Application filed November 21, 1903. Serial No. 182,174. (No model.)

*To all whom it may concern:*

Be it known that we, CHARLES L. GOEHRING and WILLIAM TROCHE, of Akron, in the county of Summit, State of Ohio, have invented certain new and useful Improvements in Glass-Grinding Machines; and we do hereby declare the following to be a full, clear, and exact description of the same, reference being had to the accompanying drawings, forming a part of this specification, and to the figures and letters of reference marked thereon.

This invention relates to improvements in glass-grinding machinery, and more especially to machinery for beveling plates by a grinding operation, although features of the invention are applicable to glass-grinding generally.

The objects of the invention are to simplify and improve the mechanical construction and arrangement of the parts, whereby the handling of the glass is facilitated, the speed of operation increased, and the wear and tear on the working mechanism reduced to a minimum.

The invention consists in certain novel details of construction and combinations and arrangements of parts, all as will now be described, and the particular features of novelty pointed out in the appended claims.

Referring to the accompanying drawings, Figure 1 is an elevation of the beveling-machine embodying the present improvements looking at the left-hand side. Fig. 2 is a similar view looking at the right-hand side of the machine. Fig. 3 is a top plan view of the machine. Fig. 4 is a longitudinal section through the machine from front to rear with parts in elevation. Fig. 5 is a front elevation with the bed, clamps for the glass, and some of the associated parts in section. Fig. 6 is a rear elevation with some of the parts in section. Fig. 7 is a front elevation, and Figs. 8 and 9 vertical horizontal sections, through the clamp-operating mechanism. Fig. 10 is a detail view of the stop mechanism. Fig. 11 is a detail perspective view of the scale and gage mechanism for indicating and the mechanism for varying the width of the bevel to be ground. Fig. 12 is a detail of one of the grinder-supporting bearings with its carriage. Fig. 13 is a perspective view of one end of the bed against which the glass is clamped with a portion of its supporting-frame separated therefrom. Fig. 14 is a diagrammatic view illustrating the adjustments of the bed in order to grind bevels of differing depth and width.

Like characters of reference in the several figures indicate the same parts.

By reference to Figs. 1 to 6 it will be seen that the working parts of the machine are mounted in a frame A of approximately rectangular form and having an overhang or upwardly-extending arms A', in which the main drive-shaft B is journaled. The grinder C, which in the present instance is in the form of a cylinder, is located below the level of the main drive-shaft and is supported in bearings C', through which the shaft of the grinder passes, and said bearings are in turn mounted on or form portions of a carriage or carriages $C^2$, adapted to slide on ways $C^3$, extending parallel to the plane of the bevel or surfaces to be ground and preferably formed on the upper edges of side portions of the frame A. As shown, the ways $C^3$ extend diagonally upward toward the front of the machine, and the grinder has a movement thereon corresponding to the necessary traverse in cutting a bevel from one edge to the other of the ground surface. Rotation is imparted to the grinder by drive-chains B', running over sprocket-wheels $B^2$ on the drive-shaft and grinder-shaft, respectively, a sufficient slack being left in said chains to permit the grinder to move on the ways $C^3$ as well as to move longitudinally of its axis, as will be hereinafter pointed out. This power for moving the grinder on the ways $C^3$ or causing it to traverse with respect to the work is transmitted to the carriages $C^2$ by connecting-rods D, preferably adjustable in length and extending back to the rear of the machine and jointed to crank-arms D' on a transverse rock-shaft $D^2$. The rock-shaft $D^2$ is oscillated through gearing and driving connections with a secondary drive-shaft E, the latter receiving its motion from the main drive-shaft B through suitable pulleys E' E' and $E^2$ $E^2$, the belt connecting the pulleys E' E² being a crossed belt, whereby the pulleys E' E² on the shaft E will be rotated in opposite directions. It will be understood that said pulleys E' E² on the shaft E are loose thereon, and the connection between said pulleys and the shaft E is effected by the clutch shown in section in Fig. 6 at E³, which clutch when moved in one direction longitudinally of the shaft will effect the engagement of one of the pulleys and when moved in the opposite direction will effect the engagement of the other of the pulleys, both pulleys being free when the clutch is in an intermediate position. The shaft E carries a worm F, meshing with a worm-gear F' on a short shaft F², journaled in the main frame and carrying at its forward end a beveled pinion F³, meshing with a bevel-wheel F⁴ on a transverse shaft F⁵. The latter shaft F⁵ carries a pinion F⁶, meshing with a gear F⁷ on a second transverse shaft F⁸, preferably extending entirely across the frame of the machine and having a central crank-arm G, provided with an adjustable crank-pin G', Fig. 4, to which a link or adjustable connecting-rod G² is jointed at one end. The opposite end of said link or connecting-rod is connected with a central crank-arm D³ on the shaft D², before described. The connections between the connecting rod or link G² and the crank D³ is a shiftable connection, whereby the said connection may be moved nearer to or farther from the axis of the shaft D² to effect a relatively rapid or slow traverse of the grinder.

The mechanism illustrated is designed to give the grinder a rapid movement during the initial and final portions of its traverse, with a slower intermediate movement. The reason for this is that during the initial and final portions of the movement the work done by the grinder and friction between the grinder and glass is relatively light, and as a consequence the grinder may be advanced with rapidity; but during the time the grinder is removing the greatest thickness of glass the friction and resistance is great, and the grinder should be given a correspondingly slow movement of traverse both in order to effect a more perfect grinding and to prevent stalling the machine or breaking the glass by excessive pressure. The movements referred to are automatically accomplished by automatically shifting the connection between the link G² and crank-arm D³, for which purpose the said connection is formed by a shaft H, mounted on the upper end of a link or fork H', Figs. 4 and 6, the latter in turn being carried by a crank-arm H² on a short transverse shaft H³. The shaft H³ carries a bevel-gear H⁴, meshing with a corresponding gear H⁵ on a vertical shaft H⁶. Shaft H⁶ carries a bevel-gear H⁷, meshing with a bevel-gear H⁸ on the shaft F². The gearing between the shafts F² and H³ are so proportioned that the said shafts will be rotated in unison, and when the stone or grinder is at either extreme of its traverse the crank H² is turned to its highest position or with the connection between the link G² and crank B³ in its position of adjustment nearest the shaft D². During the traverse of the stone the shaft H³ will have made one complete revolution, and the said connection will have been moved first down or away from the shaft D², thereby gradually decreasing the speed of grinder traverse until a minimum is reached half-way between the extreme of the movement and then back to its initial position, again increasing the speed of the movement to its maximum.

The proportioning of the gearing between the shaft F² and the shaft F⁸ is preferably such that one complete rotation of the shaft F² will move the shaft F⁸ through approximately one-eighth of a revolution. The movement of the shaft F⁸ through this portion of the arc of a circle gives a practically uniform thrust and speed to the outer end of the connecting-rod G², and in range is sufficient to effect the desired traverse of the grinder.

As before stated, the traverse movements of the grinder are controlled by the clutch E³, and in order to automatically arrest the movement at the proper time and to permit of the inauguration of the movements by the attendant the said clutch is controlled by a clutch-arm I, mounted on a vertical shaft I', having at its upper end an operating-arm I², connected to the rear end of a shifting rod I³, mounted in suitable guides on the frame and provided at its forward end with an operating-lever I⁴, by which the attendant may shift the clutch in one direction or the other. On the rod I³ are two oppositely-located springs $i$, held between bearings $i'$ on the frame, and between which springs is a pin or projection $i^2$ on the rod I³. These springs serve to bring the rod back into position with the clutch E³ central, no matter in which direction the said rod is moved, and to insure the proper positioning of the clutch the pin or projection $i^2$ works through a fork or stop $i^3$ on the frame and normally rests within the same, while the ends of the springs $i$ seat against said fork $i^3$, from which it follows that when in its intermediate position the said pin or projection is free from the springs, but when moved in one direction or the other it will compress one or the other of the springs, leaving the opposite spring unaffected. When the attendant throws the clutch into engagement with one or the other of the pulleys by shifting the rod I³, the clutch is retained in engagement by projections I⁵ on the rod I² engaging spring-pressed pawls or stops I⁶, mounted on the frame, preferably above the rod I³, and having at their upper ends heads or overhanging parts I⁷, under which knock-off projections or inclines I⁸, adjustably mounted on the carriage C², (see Fig. 10,) are adapted to pass as said carriage reaches one or the other of the extreme of its movement. As the knock-off projection lifts the pawl or stop $I^6$ the clutch-rod is released and the springs automatically shift the clutch to its intermediate position, this movement being effected when the carriage and grinder are moved in either direction, and as a result while the attendant inaugurates the traverse movement of the grinder, such movement is automatically arrested at the proper instant and the attendant must inagurate a movement in the opposite direction. The pulleys $E'$ $E'$ and $E^2$ $E^2$ are so proportioned as to give a somewhat slow advance movement to the grinder and a relatively rapid return or reverse movement.

To arrest the traverse movements at any point, provision is made for releasing the shifter-rod $I^3$ by hand, this being preferably effected by a slide $I^{10}$, operated by a hand-lever $I^{11}$ and having shoulders $I^{12}$ thereon adapted to pass beneath the pawls $I^6$ to raise the same when the hand-lever is moved in one direction or the other.

The glass or work to be beveled is clamped against a bed located on the same side of the work as that upon which the grinder is located. In the machine illustrated the bed against which the work is clamped is therefore located above the work, inasmuch as in this machine the work passes beneath the grinder. The bed referred to is indicated in the accompanying drawings by the letter K, and while it is held in fixed position during the grinding operation it is nevertheless adapted to be adjusted in such manner that the work may have bevels of different depth or width ground thereon, and it is an important feature of this invention that these adjustments shall be provided for in such manner that the plates may be transferred from one machine to another and each machine will in turn operate upon the beveled surface correctly. Obviously to accomplish these results the machines must have the capacity for accurate adjustment and must be so arranged that the adjustments or operation will not be affected nor a change be required in operating on glass of different thickness or size or of irregular thickness.

As before stated, the glass is clamped against the under surface of the bed K, the clamping being effected by a plurality of clamps L, (operated by means to be presently described,) and the bed K is preferably mounted in a frame $K'$, adjustable vertically in the main frame by adjusting-screws $K^2$, operated by a cross-shaft $K^3$, connected therewith by bevel-gears $K^4$, and provided with a hand-wheel $K^5$ at one end.

The frame $K'$ is provided with arms $K^6$, projecting toward and outside of the grinder at each end to provide for the passage of the grinder between them, and the bed K is provided with similar arms $K^7$, the ends of the arms $K^6$ and $K^7$ being pivotally connected on an axis which is in line with the under surface of the bed and as nearly as possible coincident with the edge of the glass being beveled. (See Figs. 4, 13, and 14.)

By pivoting the bed on an axis coincident with the edge of the glass the angle or inclination of the bed may be varied to give different widths of bevel without changing the depth of the bevel, and provision is made for adjusting the angle of the bed and holding it in adjusted position through the medium of an adjusting-screw $K^8$, journaled in a swing-bearing $k$ on the frame $K'$ and working in a swing-nut $k'$ in the forwardly-extending arms $k^2$ of the bed K. To provide for accurate adjustment, the frame $K'$ is provided with a pointer $k^3$ and the frame with an adjustable scale $k^4$ for indicating the vertical adjustment of the bed, and the arms $k^2$ are provided with an edge or pointer $k^5$, adapted to register with a series of scales $k^6$ on the frame $K'$. (See Fig. 11.)

A series of scales $k^6$ is provided because the vertical adjustment of the bed requires a readjustment to give the same width of bevel, and when it is remembered that commercial glass is beveled with certain depths and widths of bevel—as, for instance, one-sixteenth, two-sixteenths, or three-sixteenths inch deep and one-half, three-fourths, or one inch wide—it will be understood that when the vertical position of the bed is changed from, say, one-sixteenth to two-sixteenths inch depth, the angle of the bed must be also changed, and hence it is convenient to have a scale to indicate the width of bevel for each depth. This will be better understood from an inspection of Fig. 14, wherein the numeral 1 indicates a piece of glass, the numeral 2 the line of grinder traverse, and 3, 4, and 5 bevels of one-sixteenth by one-half inch, two-sixteenths by three-fourths inch, and three-sixteenths by one inch. The scale 6 (corresponding to $k^6$) is graduated to set the bed for bevels one-half, three-fourths, and one inch by one-sixteenth, and the scales 7 and 8 (corresponding to other of the scales $k^6$) are graduated for bevels of two-sixteenths and three-sixteenths depths, respectively.

The operator knowing the depth of the bevel from the scale $k^4$ sets the inclination of the bed by the proper one of the scales $k^6$ to give the desired width of bevel. The scale $k^4$ is made adjustable, as it may occasionally be necessary to set it to compensate for wear on the grinder or for grinders of different size.

The plural clamps L are to a certain extent independent in their action—that is to say, glass may be held by one and none by the other or plates of different thickness may be clamped and beveled correspondingly. Both clamps may be employed to clamp the same glass and both are preferably provided with stops $l$ at the lower ends, against which the glass may be accurately positioned. The clamps are pivotally mounted on supports $L'$, preferably by central ribs resting in corresponding grooves in the support, as indicated at $L^2$, and they are held in place by screws $L^3$ at the ends, as best seen in Fig. 4. The supports $L'$ are in turn pivotally mounted on the upper ends of slides M, working vertically in suitable guideways $M'$ in the frame, the axes of the clamps and their supports being at right angles to each other in order that the clamps may adapt themselves to the under surface of the glass, and thus position the glass against the bed and hold the same with an even pressure even though the glass be of uneven thickness.

The slides M rest at their lower ends on an evener or equal-arm lever N, centrally pivoted in the lower end of a central slide $N'$, suitable set-screws $M^2$ being provided to prevent undue tilting of the lever and to take the pressure where one table only is in use. The upper portion of the central slide constitutes a rack-bar $N^2$, with which a pinion $N^3$ meshes. Pinion $N^3$ is mounted on a cross-shaft $N^4$, having a worm-wheel $N^5$ at one end, with which a worm $N^6$ meshes. Worm $N^6$ is mounted on a shaft $N^7$, carrying a hand or crank wheel $N^8$, and by the rotation of the latter the operator may move the clamps up, so as to force the glass up tightly against the bed.

To counterbalance the weight of the parts, the shaft $N^4$ is provided at one end with an adjustable crank-arm O, connected by a link $O'$ with the short arm of a counterbalance-lever $O^2$, having an adjustable weight $O^3$ thereon.

In the art of glass-grinding, particularly in connection with machinery for effecting a positive feed movement or for forcing the grinding, as in the present machine, it has been found to be highly advantageous to effect the grinding operations beneath the surface of a body of liquid, such as water, and in the present machine I have embodied a construction whereby this may be effected and at the same time during the positioning of the glass or when it is to be inspected at the end of the traverse movement the body of water will be withdrawn to a sufficient extent to expose the glass at the grinding-point.

By reference particularly to Figs. 4 and 5 it will be seen that a tank having side walls Q, secured to the rigid frame of the machine, surrounds the grinder, clamps, and bed and extends to a sufficient height to permit of the immersion of the grinder and said other parts, together with the glass, at the grinding-point. The bottom of said tank is preferably formed of flexible material—such, for instance, as rubber or leather $Q'$—having its edges firmly clamped to the bottom portions of the sides Q, and the portions immediately around the vertically-adjustable supports $L^4$ are firmly clamped to said supports, so as to prevent leakage at any of these points; but at the same time the flexibility of the bottom of the tank will permit said supports to move vertically either in unison or independently to the necessary extent. The rear wall of the tank is preferably inclined, as shown in dotted lines, Fig. 4, and to the walls of an opening formed in this inclined portion of the tank there is clamped the mouth of a depending receptacle R, such receptacle preferably being compressible or in the form of a flexible bag with a capacity when distended sufficient to reduce the water-level in the tank to a point below the level of the grinding-point, but when compressed and its contents ejected into the tank to raise the water-level to the desired point above the grinding-level.

When in the form of a flexible bag, as illustrated, the receptacle R is preferably clamped against a supporting plate or board $R'$, carried by the frame of the machine, while its opposite side is supported by a movable board or compressor $R^2$, mounted on the end of crank-arms $R^3$, carried by a transverse shaft $R^4$. The shaft $R^4$ in turn carries an arm $R^5$, provided with a roller $R^6$, running in the periphery of a cam $R^7$, mounted on the shaft $F^5$ or the hub of the gear-wheel $F^4$, heretofore described. The cam $R^7$ is of such form that the receptacle R is compressed or its area reduced so as to raise the water-level in the tank at all times, save when the grinder is at the rearmost extreme of its traverse or the parts are in proper position for the glass to be inserted or removed.

By withdrawing the water during the time that the glass is to be inserted or removed the floating of the plate, due to the action of the grinder tending to create currents of water which will force the water beneath the plate, is entirely obviated, and, furthermore, the danger of grindings distributing themselves over the clamps when no glass is present is overcome, and the attendant is relieved from the necessity of cleaning and preparing the parts for the reception of a new plate after the removal of each ground plate. A drain-pipe $R^9$ opens out from a point near the bottom of the receptacle R to permit of the ready removal of detritus, which will accumulate from the grinding operations.

The grinder, in addition to its rotary and movements of traverse, is given a movement longitudinally of its axis in order to distribute the wear and give a finer surface to the ground plate, and in the machine illustrated this movement longitudinally of its axis is effected by mounting the grinder-shaft in its bearings, so as to be capable of a limited longitudinal movement therein.

At one end the grinder-shaft is provided with a grooved collar S, with which projections or screws $S'$ on a forked lever $S^2$ engage, said lever being pivoted in bearings $S^3$ on one of the carriages C². The upper end of the lever S² is provided with a vertically-sliding box or bearing S$^x$, through which passes a long crank S⁴ on a shaft S⁵, journaled on the frame parallel to the ways C³. The shaft S⁵ is rotated by bevel-gears S⁶ S⁷, the latter mounted on a short transverse shaft S⁸, driven by belt and pulleys S⁹ from the main drive-shaft B. This construction permits the grinder to traverse on the ways C³, and at the same time the rotation of the shaft S⁵ imparts the desired longitudinal movement thereto.

To form true ground faces, it is very necessary that the grinder should have a true face maintained thereon, and a dressing mechanism forms a part of the present machine, such dresser occupying a position out of the way of other portions of the mechanism and being of such construction that it may be thrown into or out of operation at the will of the attendant. Thus, if desired, the grinder may be dressed either during the grinding operation or when the stone is running free.

The arms A' are provided at their ends with a frame T, Figs. 1 to 4, formed with ways T' for a dresser-carriage T², adapted to travel parallel with the axis of the grinder and to be moved by a feed-screw T³, journaled in the frame and having a gear-wheel T⁴, Fig. 2, at one end. The gear-wheel T⁴ and feed-screw are rotated in one direction or the other by one or the other of a pair of gears T⁵, mounted in an oscillatory frame T⁶, controlled by a handle T⁷, with a suitable lock to hold one or the other of the gears T⁵ in mesh with the gear T⁴. The gears T⁵ are driven by a belt U, running over pulleys U' on the gears in proper direction to impart opposite rotation to them and over a drive-pulley U² on the main drive-shaft B. The dresser V is adjustable toward and from the grinder by a screw V' and may be clamped in position by a set-screw V².

It will be seen that the dresser may be caused to travel back and forth along the grinder by the power mechanism described or, if desired, it may be shifted by hand, for which purpose the wheel T⁴ is provided with a handle or hand-wheel T⁸. (Best shown in Figs. 2 and 3.)

It will be noted that the driving connections with the grinder are all outside of the frame, and hence practically the full width of the frame may be utilized for the grinding operations. In other words, by this arrangement a longer edge may be beveled without increasing the size of the machine.

The adjustment of the parts for bevels of different depth and width may be accurately and easily made, and the arrangement of the mechanism is such that there is little or no liability of spring or distortion under heaving pressure, and at the same time the moving parts of the mechanism are relatively light, thus imposing no increased wear on the driving mechanism and eliminating as far as possible the weight to be handled by the operator in clamping the glass in position for grinding.

Having thus described our invention, what we claim as new, and desire to secure by Letters Patent, is—

1. In glass-beveling machines, the combination with the grinder, of a bed against which the glass is clamped pivotally mounted with its axis substantially coincident with the edge to be beveled, means for clamping the glass against the bed and means for moving the grinder and glass with respect to each other parallel with the plane of the bevel; substantially as described.

2. In glass-beveling machines, the combination with the grinder, of a bed against which the glass is clamped located on the same side of the glass with the grinder and pivotally mounted with its axis substantially coincident with the edge to be beveled, means for clamping the glass against the bed and means for moving the grinder and glass with respect to each other parallel with the plane of the bevel; substantially as described.

3. In glass-beveling machines, the combination with the grinder, of a bed against which the glass is clamped, located on the same side of the glass with the grinder and pivotally mounted with its axis substantially coincident with the edge to be beveled, means for bodily adjusting said bed, means for clamping the glass against the bed and means for moving the grinder and glass with respect to each other parallel with the plane of the bevel; substantially as described.

4. In a glass-beveling machine, the combination with the grinder, of a bed against which the glass is clamped, pivotally mounted with its axis substantially coincident with the edge to be beveled, a vertically-adjustable frame in which said bed is pivotally mounted, means for clamping the glass against the bed and means for moving the grinder and glass with respect to each other parallel with the plane of the bevel; substantially as described.

5. In a glass-beveling machine, the combination with the grinder, of a bed against which the glass is clamped, a vertically-adjustable frame in which said bed is pivotally mounted on an axis substantially coincident with the edge to be beveled, a gage for indicating the vertical adjustment of said frame to determine the depth of the bevel, and a series of gages for indicating the angular adjustment of the bed to determine the width of the bevel at different depths; substantially as described.

6. In a glass-beveling machine, the combination with the rotary grinder, of a bed against which the glass is clamped, a vertically-adjustable frame in which said bed is pivotally mounted, of an axis substantially coincident with the edge to be beveled, adjusting-screws for moving said frame vertically and for adjusting the angular position of the bed on the frame respectively, a gage for indicating the vertical adjustment of the frame to determine the depth of the bevel and a series of gages for indicating the angular position of the bed for determining the width of bevels of different depth; substantially as described.

7. In a glass-beveling machine, the combination with the rotary grinder having a traverse movement parallel with the plane of the bevel, of a bed against which the face of the glass is clamped, a vertically-movable frame in which said bed is pivotally mounted on an axis substantially coincident with the edge to be beveled, means for determining the vertical adjustment of the frame and angular position of the bed, and vertically-movable clamps for holding the glass in position against the bed; substantially as described.

8. In a glass-beveling machine, the combination with the rotary grinder having a traverse movement parallel with the plane of the bevel, of a vertically-adjustable frame having arms projecting at each end of the grinder, a bed against which the glass is clamped having arms projecting at each end of the grinder, pivotal connections between said arms constituting an axis for the bed substantially coincident with the edge to be beveled, means for adjusting the frame and bed and means for clamping the glass against the bed; substantially as described.

9. In a glass-beveling machine, the combination with the rotary grinder having a traverse movement parallel with the plane of the bevel, a vertically-movable frame located in front of said grinder and having rearwardly-extending arms at each end of the grinder, a bed having rearwardly-extending arms at each end of the grinder, pivotal connections between said arms constituting an axis for the bed substantially coincident with the edge to be beveled, means for adjusting the frame and bed and a vertically-movable clamp located below the bed and extending beneath the grinding-point to support the edge being beveled; substantially as described.

10. In a glass-beveling machine, the combination with the grinder and bed located above the level of the glass, of a plurality of clamps located below the level of the glass, an evener supporting said clamp and an adjusting mechanism coöperating with said evener; substantially as described.

11. In a glass-beveling machine, the combination with the rotary grinder and overhanging bed against which the glass is clamped, of a plurality of vertically-movable clamps, supports on which said clamps are mounted, a centrally-pivoted evener coöperating with said supports and means for moving said evener vertically to adjust the clamps; substantially as described.

12. In a glass-beveling machine, the combination with the grinder and bed against which the glass is clamped, of a plurality of clamps movable toward and from said bed, a centrally-pivoted evener for moving said clamps toward and from the bed, a slide in which said evener is pivoted and means for adjusting the slide; substantially as described.

13. In a glass-beveling machine, the combination with the grinder and bed against which the glass is clamped, of a plurality of clamps, vertically-movable supports on which said clamps are pivotally mounted, a centrally-pivoted lever on which said supports rest, a vertically-movable slide in which the lever is pivoted and gearing for raising and lowering said slide; substantially as described.

14. In a glass-beveling machine, the combination with the grinder, overhanging bed against the under surface of which the glass is clamped and means for adjusting the angular position of said bed, of a plurality of clamps, vertically-movable supports on which said clamps are pivotally mounted to conform to the angular position of said bed, centrally-pivoted evener-lever on which the supports rest, a slide in which said lever is pivotally mounted, and a rack and pinion for moving said slide to raise and lower the clamps; substantially as described.

15. In a glass-beveling machine, the combination with the grinder, the overhanging bed against which the glass is clamped, means for adjusting the angular position of said bed and means for adjusting said bed bodily with respect to the grinder, of a plurality of clamps, vertically-movable supports on which said clamps are pivotally mounted, a centrally-pivoted evener-lever on which said supports rest, a slide in which said lever is pivoted, a rack and pinion for raising and lowering said slide and a worm-wheel and worm for operating said pinion; substantially as described.

16. In a glass-beveling machine, the combination with the grinder and overhanging bed to the under surface of which the glass is clamped, of a plurality of clamps, supports on which said clamps are pivotally mounted, a centrally-pivoted evener-lever on which the supports rest, a slide in which said lever is mounted, means for adjusting said slide and adjustable stops for limiting the pivotal movement of the lever; substantially as described.

17. In a glass-grinding machine, the combination with the bed, against which the glass is clamped, and means for clamping the glass against said bed, of a rotary grinder having a traverse parallel with the plane of the bevel, of means for imparting a movement to said grinder longitudinally of its axis, embodying a lever pivotally mounted on one of the grinder-bearings, a collar on the grinding-shaft with which said lever coöperates, a rotary shaft having a crank extending parallel with the traverse movements of the grinder and a bearing on said lever coöperating with the crank; substantially as described.

18. In a glass-grinding machine, the combination with the bed, against which the glass is clamped, and means for clamping the glass against said bed, of a rotary grinder having a traverse parallel with the plane of the bevel, of means for imparting a movement to said grinder longitudinally of its axis, embodying a lever pivotally mounted on one of the grinder-bearings, a collar on the grinding-shaft with which said lever coöperates, a rotary shaft having a crank extending parallel with the traverse movements of the grinder and a movable bearing on the lever coöperating with said crank; substantially as described.

19. In a glass-grinding machine, the combination with means for clamping the glass, a grinder and means for moving the grinder parallel with the plane of the bevel, of a trip mechanism for arresting the movement of the grinder at each end of its traverse and a manually-operated controller for said trip mechanism, for arresting the movement of the grinder at intermediate points; substantially as described.

CHARLES L. GOEHRING.
WILLIAM TROCHE.

Witnesses:
H. M. HOLLINGER,
THOMAS CLEMINGER.